US012749708B2

(12) United States Patent
Ahn et al.

(10) Patent No.: US 12,749,708 B2
(45) Date of Patent: Sep. 29, 2026

(54) GEL POLYMER ELECTROLYTE AND LITHIUM SECONDARY BATTERY INCLUDING THE SAME

(71) Applicants: LG ENERGY SOLUTION, LTD., Seoul (KR); IUCF-HYU (INDUSTRY-UNIVERSITY COOPERATION FOUNDATION HANYANG UNIVERSITY), Seoul (KR)

(72) Inventors: Kyoung Ho Ahn, Daejeon (KR); Dong Won Kim, Seoul (KR); Won Tae Lee, Daejeon (KR); Bo Ra Jeong, Gwangju (KR); Da Ae Lim, Seoul (KR); Chul Haeng Lee, Daejeon (KR); You Kyeong Jeong, Daejeon (KR)

(73) Assignees: LG ENERGY SOLUTION, LTD., Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 448 days.

(21) Appl. No.: 18/287,292

(22) PCT Filed: Jul. 29, 2022

(86) PCT No.: PCT/KR2022/011251

§ 371 (c)(1),
(2) Date: Oct. 17, 2023

(87) PCT Pub. No.: WO2023/008970

PCT Pub. Date: Feb. 2, 2023

(65) Prior Publication Data

US 2024/0213531 A1 Jun. 27, 2024

(30) Foreign Application Priority Data

Jul. 29, 2021 (KR) ........................ 10-2021-0099776

(51) Int. Cl.
*H01M 10/0565* (2010.01)
*H01M 10/052* (2010.01)
*H01M 10/42* (2006.01)

(52) U.S. Cl.
CPC ..... *H01M 10/0565* (2013.01); *H01M 10/052* (2013.01); *H01M 10/4235* (2013.01);
(Continued)

(58) Field of Classification Search
CPC ........... H01M 10/052; H01M 10/0525; H01M 10/0565; H01M 10/0567; H01M 10/0569;
(Continued)

(56) References Cited

U.S. PATENT DOCUMENTS

2003/0055120 A1 3/2003 Blomquist
2004/0249081 A1 12/2004 Blomquist
(Continued)

FOREIGN PATENT DOCUMENTS

CN 106558665 A 4/2017
CN 108288729 A 7/2018
(Continued)

OTHER PUBLICATIONS

Office Action dated Dec. 2, 2024 issued in Japanese Patent Application No. 2023-563871.
(Continued)

*Primary Examiner* — Timothy C Cleveland
(74) *Attorney, Agent, or Firm* — Morgan, Lewis & Bockius LLP

(57) ABSTRACT

The present disclosure aims at providing a gel polymer electrolyte which has a great effect of inhibiting leakage of
(Continued)

an organic solvent by confining the organic solvent in a three-dimensional polymer network and has oxidation stability, flame retardancy, thermal stability, and excellent lithium ion conductivity. In order to achieve the above object, the present disclosure provides a gel polymer electrolyte including a cross-linked polymer having a thiol-ene structure, wherein the thiol-ene structure is formed by a click reaction of a thiol group of a thiol compound containing at least four reactive thiol groups per molecule and an acrylic group of a fluorinated polyether diacrylate.

17 Claims, 2 Drawing Sheets

(52) U.S. Cl.
CPC ............... *H01M 2300/0082* (2013.01); *H01M 2300/0085* (2013.01)

(58) Field of Classification Search
CPC ............... H01M 10/058; H01M 10/42; H01M 10/4235; H01M 2300/0082; H01M 2300/0085; Y02E 60/10; Y02P 70/50
See application file for complete search history.

(56) References Cited

U.S. PATENT DOCUMENTS

| | | | |
|---|---|---|---|
| 2015/0132639 | A1 | 5/2015 | Kodama |
| 2017/0093002 | A1 | 3/2017 | Choi et al. |
| 2017/0373347 | A1 | 12/2017 | Lee et al. |
| 2018/0342767 | A1 | 11/2018 | Ahn et al. |
| 2019/0058217 | A1 | 2/2019 | Ahn et al. |
| 2021/0380745 | A1 | 12/2021 | Commarieu et al. |
| 2022/0025126 | A1 | 1/2022 | Yoon et al. |
| 2022/0293958 | A1 * | 9/2022 | Jang ...................... H01M 4/663 |

FOREIGN PATENT DOCUMENTS

| | | | |
|---|---|---|---|
| CN | 108352569 | A | 7/2018 |
| CN | 108780921 | A | 11/2018 |
| CN | 110172115 | A | 8/2019 |
| CN | 111748095 | A | 10/2020 |
| CN | 111769321 | A | 10/2020 |
| CN | 113166425 | A | 7/2021 |
| JP | 2001-210333 | A | 8/2001 |
| JP | 2004-536931 | A | 12/2004 |
| JP | 2014-026885 | A | 2/2014 |
| JP | 2020-076024 | A | 5/2020 |
| KR | 10-0278539 | B | 1/2001 |
| KR | 10-2011-0137567 | A | 12/2011 |
| KR | 10-2018-0000942 | A | 1/2018 |
| KR | 10-2018-0026358 | A | 3/2018 |
| KR | 10-2019-0080459 | A | 7/2019 |
| KR | 10-2020-0118470 | A | 10/2020 |

OTHER PUBLICATIONS

Sungguk Park et al., Quasi-Solid-State Electrolyte Synthesized Using a Thiol-Ene Click Chemistry for Rechargeable Lithium Metal Batteries with Enhanced Safety, ACS applied Materials & Interfaces, 2020, vol. 12, pp. 19553-19562.
International Search Report (with partial translation) and Written Opinion dated Nov. 1, 2022, for corresponding International Patent Application No. PCT/KR2022/010834.
Extended European Search Report dated Sep. 27, 2024 issued in European Patent Application No. 22849943.0.
Office Action issued on Jun. 30, 2026 in Chinese Patent Application No. 202280030682.3.

* cited by examiner

【FIG. 1】
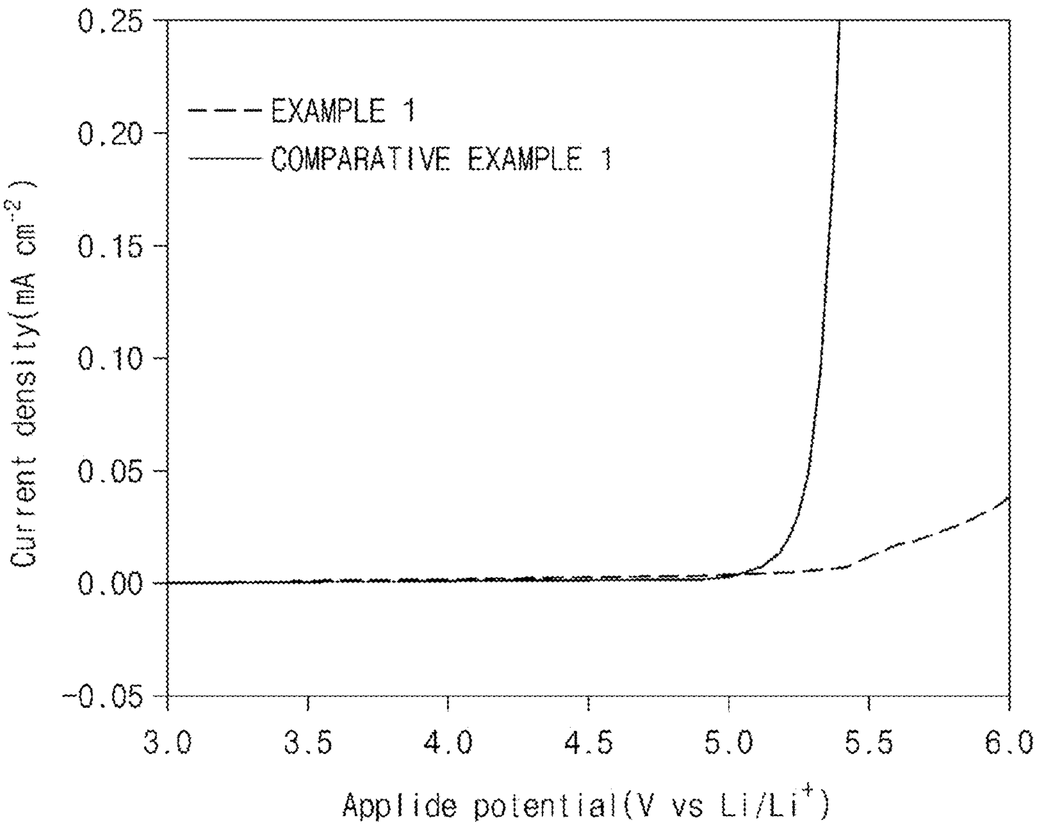

GEL POLYMER ELECTROLYTE AND LITHIUM SECONDARY BATTERY INCLUDING THE SAME

CROSS-REFERENCE TO RELATED APPLICATIONS

This application claims priority from Korean Patent Application No. 10-2021-0099776, filed on Jul. 29, 2021, the disclosure of which is incorporated by reference herein.

TECHNICAL FIELD

The present disclosure relates to a gel polymer electrolyte, and a lithium secondary battery including the same and a preparation method thereof.

BACKGROUND ART

Recently, demand for a secondary battery having high stability as well as high capacity and high output is increasing as an application area of lithium secondary batteries is rapidly expanding not only to electricity, electronics, communication, and power supply of electronic devices such as computers, but also to power storage supply of automobiles or large-area devices such as power storage devices.

In general, after a positive electrode, which is prepared by coating a positive electrode current collector with a positive electrode material mixture in which a positive electrode active material formed of a lithium-containing transition metal oxide, a binder, and/or a conductive agent are mixed, and a negative electrode, which is prepared by coating a negative electrode current collector with a negative electrode material mixture in which a carbon material and/or silicon negative active electrode material capable of intercalating and deintercalating lithium ions, a binder, and/or a conductive agent are mixed, are stacked on both sides of a separator to form an electrode assembly having a predetermined shape, a lithium secondary battery is prepared by inserting the electrode assembly and an electrolyte solution into a battery case.

In this case, as the electrolyte solution, it is generally known to use a non-aqueous electrolyte solution in which a lithium salt is dissolved in a carbonate-based organic solvent such as ethylene carbonate (EC), propylene carbonate (PC), and diethyl carbonate (DEC). However, the above carbonate-based organic solvents have disadvantages in that they are not only highly likely to leak when used for a long period of time, but safety is also low due to the risk of fire caused by an increase in ambient temperature and temperature of the battery itself. Thus, developments of an electrolyte for a lithium secondary battery, which may compensate for these disadvantages, are being attempted, and, among them, a gel polymer electrolyte for confining a liquid electrolyte in a polymer structure has been proposed as a new electrolyte system.

However, in a case in which the gel polymer electrolyte is used in a lithium secondary battery, there is a problem in that performance of the lithium secondary battery is degraded due to low lithium ion conductivity.

DISCLOSURE OF THE INVENTION

Technical Problem

An aspect of the present disclosure provides a gel polymer electrolyte having oxidation stability, flame retardancy, thermal stability, a great effect of inhibiting leakage of an organic solvent, and excellent lithium ion conductivity.

Another aspect of the present disclosure provides a lithium secondary battery in which thermal stability is excellent and Overall performance, such as cycle characteristics, is improved by including the gel polymer electrolyte.

Another aspect of the present disclosure provides a method of preparing the lithium secondary battery.

Technical Solution

According to an aspect of the present disclosure, there is provided a gel polymer electrolyte including a cross-linked polymer having a thiol-ene structure, wherein the thiol-ene structure is formed by a click reaction of a thiol group of a thiol compound containing at least four reactive thiol groups per molecule and an acrylic group of a fluorinated polyether diacrylate.

According to another aspect of the present disclosure, there is provided a lithium secondary battery including the gel polymer electrolyte.

Advantageous Effects

With respect to a cross-linked polymer having a thiol-ene structure which is included in a gel polymer electrolyte of the present disclosure, the chemically crosslinked gel polymer electrolyte is prepared by using a click reaction of a thiol group of a thiol compound containing at least four reactive thiol groups per molecule and an acrylic group of a fluorinated polyether diacrylate. In a case in which the gel polymer electrolyte is prepared through the click reaction, since there is almost no side reaction and the thiol group and the acrylic group selectively and rapidly react, there is an advantage in that yield of the cross-linked polymer is high.

Also, the gel polymer electrolyte of the present disclosure, which includes the cross-linked polymer prepared by the click reaction, has an excellent effect of preventing leakage of an organic solvent by confining the organic solvent in a three-dimensional polymer network.

Furthermore, since the gel polymer electrolyte of the present disclosure has a cross-linked structure, there is little change in the structure even with changes in external environment or the passage of time, and thus it has excellent structural, thermal, and mechanical stabilities.

Also, according to the present disclosure, since the fluorinated ether diacrylate having flame retardant properties is used as a crosslinking agent, a secondary battery using the gel polymer electrolyte of the present disclosure has an effect of improving thermal stability and suppressing a calorific value of an electrode. The gel polymer electrolyte according to the present disclosure has an effect of excellent oxidation stability due to fluorine atoms contained in the fluorinated ether diacrylate crosslinking agent.

Thus, in a case in which the gel polymer electrolyte of the present disclosure is used, since oxidation stability, flame retardancy, and thermal stability are not only improved, but cycle life characteristics and safety are also improved, a lithium secondary battery with improved overall performance may be achieved.

BRIEF DESCRIPTION OF THE DRAWINGS

FIG. 1 is a result of measuring linear sweep voltammograms (LSV) in order to evaluate electrochemical stabilities of Example 1 and Comparative Example 1.

MODE FOR CARRYING OUT THE INVENTION

Figure 2A:
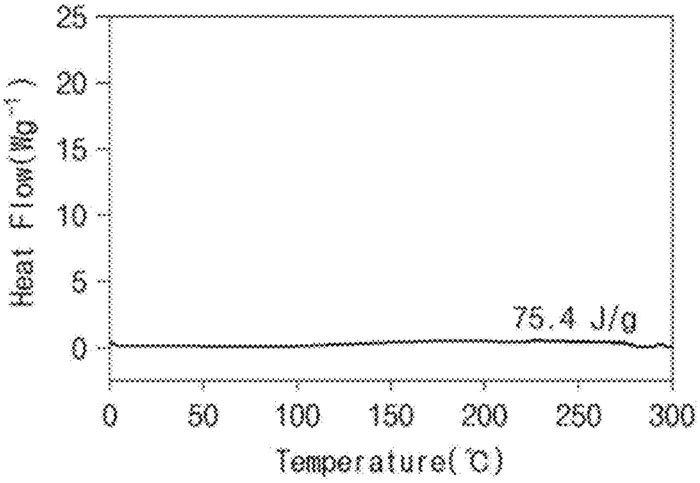
FIGS. 2A to 2C are each a result of measuring calorific values during charge and discharge of lithium secondary batteries using electrolytes of Example 1 and Comparative Examples 1 and 2.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Also, the expressions "a" and "b" in the description of "a to b carbon atoms" in the present specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $—CH_2—$, $—CH_2CH_2—$, $—CH_2CH_2CH_2—$, $—CH_2CH(CH_3)—$, $—CH(CH_3) CH_2—$, and $—CH(CH_3) CH_2CH_2—$.

Furthermore, in the present specification, the expression "alkylene group" denotes a branched or unbranched divalent saturated hydrocarbon group.

Also, both the alkyl group and the alkylene group in the present specification may be substituted or unsubstituted. Unless otherwise defined, the expression "substitution" denotes that at least one hydrogen bonded to carbon is substituted with an element other than hydrogen, for example, an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a halogen atom, a fluoroalkyl group having 1 to 20 carbon atoms, a nitro group, a nitrile group, an aryl group having 6 to 20 carbon atoms, a heteroaryl group having 2 to 20 carbon atoms, or a haloaryl group having 6 to 20 carbon atoms.

Hereinafter, the present disclosure will be described in more detail.

Gel Polymer Electrolyte

The present disclosure relates to a gel polymer electrolyte including a cross-linked polymer having a thiol-ene structure, wherein the thiol-ene structure may be formed by a click reaction of a thiol group of a thiol compound containing at least four reactive thiol groups per molecule and an acrylic group of a fluorinated polyether diacrylate.

The thiol compound containing at least four reactive thiol groups per molecule, for example, may be at least one selected from the group consisting of pentaerythritol tetrakis (3-mercaptopropionate), dipentaerythritol hexakis (3-mercaptopropionate), pentaerythrityl tetrathiol, tetrakis(2-mercaptoethyl) silane, and benzene-1,2,4,5-tetrathiol. A three-dimensional polymer network may be formed by using the above-described thiol compound as a crosslinking agent. Such a three-dimensional polymer network may trap an organic solvent, and, as a result, there is an effect of preventing leakage of the organic solvent.

The fluorinated polyether diacrylate may be represented by Formula 1 below:

[Formula 1]

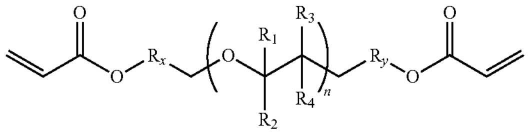

In Formula 1, Rx and Ry may each independently be an alkylene group having 1 to 10 carbon atoms, preferably an alkylene group having 1 to 5 carbon atoms, and more preferably an alkylene group having 1 to 3 carbon atoms.

In Formula 1, $R_1$ to $R_4$ may each independently be selected from hydrogen (H), an alkyl group having 1 to 10 carbon atoms, and halogen, and, preferably, at least one of $R_1$ to $R_4$ may be halogen. Most preferably, at least one of $R_1$ to $R_4$ may be a fluoro group, and a gel polymer electrolyte having excellent flame retardancy and thermal stability may be obtained by using the polyether diacrylate substituted with fluoro as a crosslinking agent.

In Formula 1, n may be an integer of 1 to 5, and, preferably, n may be an integer of 2 to 4.

The fluorinated polyether diacrylate used as the crosslinking agent in the gel polymer electrolyte of the present disclosure may be represented by Formula 1-1 below. In a case in which the perfluorinated polyether diacrylate of Formula 1-1 is used, a gel polymer electrolyte having excellent flame retardancy and thermal stability may be obtained.

[Formula 1-1]

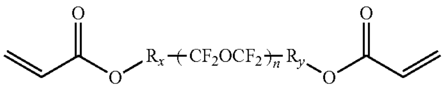

In Formula 1, Rx and Ry may each independently be an alkylene group having 1 to 10 carbon atoms, preferably an alkylene group having 1 to 5 carbon atoms, and more preferably an alkylene group having 1 to 3 carbon atoms.

In Formula 1-1, n may be an integer of 1 to 5, and, preferably, n may be an integer of 2 to 4.

Specifically, the fluorinated polyether diacrylate used as the crosslinking agent in the gel polymer electrolyte of the present disclosure may be represented by Formula 1-2 below.

[Formula 1-2]

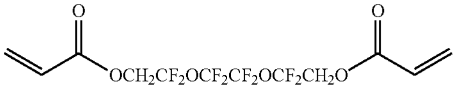

A weight-average molecular weight of the fluorinated polyether diacrylate used as the crosslinking agent in the gel polymer electrolyte of the present disclosure may be in a range of 200 g/mol to 2,000 g/mol, preferably 200 g/mol to 1,000 g/mol, and more preferably 300 g/mol to 600 g/mol. In a case in which the weight-average molecular weight of the fluorinated polyether diacrylate satisfies the above range, since a precursor including the fluorinated polyether diacrylate is well impregnated into a cell during preparation of a secondary battery, excellent battery characteristics may be exhibited.

The gel polymer electrolyte according to the present disclosure may further include a lithium salt and an organic solvent in addition to the cross-linked polymer having a thiol-ene structure.

The lithium salt is used as an electrolyte salt in the lithium secondary battery, wherein it is used as a medium for transferring ions. Typically, the lithium salt, for example, may include Lit as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3$ $(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, LIN $(SO_2F)_2$), LiBETI (lithium bis(pentafluoroethanesulfonyl)imide, LIN $(SO_2CF_2CF_3)_2$), and LiTFSI (lithium bis(trifluoromethanesulfonyl)imide, $LiN(SO_2CF_3)_2$) or a mixture of two or more thereof. In addition to these materials, a lithium salt typically used in an electrolyte of a lithium secondary battery may be used without limitation. Among them, LiTFSI is particularly preferable in terms of high thermal stability in a heat treatment process and high ionic conductivity and improved flame retardancy in the secondary battery.

An organic solvent typically used in a non-aqueous electrolyte may be used as the organic solvent without limitation. For example, the organic solvent may include at least one organic solvent selected from the group consisting of a cyclic carbonate-based organic solvent, a linear carbonate-based organic solvent, a linear ester-based organic solvent, a cyclic ester-based organic solvent, an ether-based organic solvent, a glyme-based solvent, and a nitrile-based organic solvent.

The cyclic carbonate-based organic solvent, as a highly viscous organic solvent, is an organic solvent which may well dissociate the lithium salt in the electrolyte due to high permittivity, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate.

The linear carbonate-based organic solvent is an organic solvent having low viscosity and low permittivity, wherein typical examples thereof may be at least one organic solvent from the group consisting of dimethyl carbonate (DMC), diethyl carbonate (DEC), dipropyl carbonate, ethylmethyl carbonate (EMC), methylpropyl carbonate, and ethylpropyl carbonate.

The linear ester-based organic solvent may include at least one organic solvent selected from the group consisting of methyl acetate, ethyl acetate, propyl acetate, methyl propionate, ethyl propionate, propyl propionate, and butyl propionate.

The cyclic ester-based organic solvent may include at least one organic solvent selected from the group consisting of γ-butyrolactone, γ-valerolactone, γ-caprolactone, σ-valerolactone, and ε-caprolactone.

The ether-based solvent may include at least one organic solvent selected from the group consisting of dimethyl ether, diethyl ether, dipropyl ether, methylethyl ether, methylpropyl ether, ethylpropyl ether, 1,3-dioxolane (DOL), and 2,2-bis(trifluoromethyl)-1,3-dioxolane (TFDOL).

The glyme-based solvent is a solvent having higher permittivity and lower surface tension than the linear carbonate-based organic solvent as well as less reactivity with metal, wherein the glyme-based solvent may include at least one organic solvent selected from the group consisting of dimethoxyethane (glyme, DME), diethoxyethane, diglyme, triglyme (triglyme), and tetra-glyme (TEGDME).

The nitrile-based solvent may include at least one organic solvent selected from the group consisting of acetonitrile, propionitrile, butyronitrile, valeronitrile, caprylontrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, fluorophenylacetonitrile, and 4-fluorophenylacetonitrile.

Specifically, the organic solvent may include the cyclic carbonate-based organic solvent, the linear carbonate-based organic solvent, or a mixed organic solvent thereof, and, among them, the linear carbonate-based organic solvent is preferable in terms of improving ionic conductivity of the electrolyte due to its low viscosity, and dimethyl carbonate (DMC) is particularly preferable.

The gel polymer electrolyte of the present disclosure may include the cross-linked polymer having a thiol-ene structure and the lithium salt in a weight ratio of 1:11 to 1:0.5, preferably 1:7 to 1:0.5, and more preferably 1:6 to 1:1. In a case in which the weight ratio of the cross-linked polymer having a thiol-ene structure to the lithium salt satisfies the above range, excellent battery characteristics may be exhibited due to high ionic conductivity.

In the gel polymer electrolyte according to the present disclosure, the cross-linked polymer having a thiol-ene structure may be included in an amount of 10 parts by weight to 80 parts by weight, preferably 20 parts by weight to 80 parts by weight, more preferably 20 parts by weight to 75 parts by weight, and most preferably 20 parts by weight to 50 parts by weight based on 100 parts by weight of the organic solvent. In the gel polymer electrolyte, in a case in which the amount of the cross-linked polymer having a thiol-ene structure with respect to the organic solvent satisfies the above range, since high lithium ion conductivity and oxidation stability may be secured and the amount of the organic solvent used may be reduced, there is an advantage in that the leakage may be prevented and flame retardant properties may be obtained at the same time.

The gel polymer electrolyte according to the present disclosure may have a lithium ion conductivity at 25° C. of $1.0\times10^{-3}$ S/cm or more, preferably $1.0\times10^{-3}$ S/cm to $5.0\times10^{-3}$ S/cm, and more preferably $1.4\times10^{-3}$ S/cm to $3.0\times10^{-3}$ S/cm, for example, $1.5\times10^{-3}$ S/cm to $3.0\times10^{-3}$ S/cm. In a case in which the lithium ion conductivity of the gel polymer electrolyte satisfies the above range, a desired level of secondary battery characteristics may be obtained.

The gel polymer electrolyte according to the present disclosure may have a lithium ion conductivity at 45° ° C. of $2.0\times10^{-3}$ S/cm or more, preferably $2.0\times10^{-3}$ S/cm to $1.0\times10^{-2}$ S/cm, and more preferably $2.0\times10^{-3}$ S/cm to $4.0\times10^{-3}$ S/cm. In a case in which the lithium ion conductivity of the gel polymer electrolyte satisfies the above range, a desired level of secondary battery characteristics may be obtained.

The ionic conductivity, for example, may be measured at an amplitude of 50 mV and a frequency range of 10 Hz to $1.0\times10^6$ Hz using an IM6 instrument by Zahner Electrik.

The gel polymer electrolyte of the present disclosure may further include a known electrolyte additive in the gel polymer electrolyte, if necessary, in order to prevent the occurrence of collapse of a negative electrode due to decomposition of the gel polymer electrolyte in a high output environment or to further improve low-temperature high rate discharge characteristics, high-temperature stability, overcharge prevention, and an effect of suppressing battery swelling at high temperature.

Typical examples of the other electrolyte additives may include at least one additive for forming a solid electrolyte interface (SEI) which is selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluoro (bisoxalato)phosphate, lithium difluorophosphate, tetramethyl trimethyl silyl phosphate, trimethyl silyl phosphite, tris(2,2,2-trifluoroethyl)phosphate, and tris(trifluoroethyl)phosphite.

The borate-based compound may include tetraphenylborate, lithium oxalyldifluoroborate (LiODFB), and lithium bis(oxalato) borate ($LiB(C_2O_4)_2$, LiBOB).

The nitrile-based compound may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the gel polymer electrolyte, wherein the lithium salt-based compound may include $LiPO_2F_2$ or $LiBF_4$.

In a case in which, among these other electrolyte additives, vinylene carbonate, vinyl ethylene carbonate, or succinonitrile is additionally included, a more robust SEI may be formed on a surface of the negative electrode during an initial activation process of the secondary battery.

In a case in which the $LiBF_4$ is included, high-temperature stability of the secondary battery may be improved by suppressing generation of a gas which may be generated due to the decomposition of the electrolyte at high temperature.

Two or more other electrolyte additives may be mixed and used, and the additives may be included in an amount of 0.01 wt % to 2 wt %, preferably 0.01 wt % to 1.5 wt %, and more preferably 0.05 wt % to 1 wt % based on a total weight of the gel polymer electrolyte. When the amount of the additive satisfies the above range, an effect of improving ionic conductivity and cycle characteristics is more excellent.

Lithium Secondary Battery

The present disclosure may also provide a lithium secondary battery including the gel polymer electrolyte.

Specifically, the lithium secondary battery may include a positive electrode including a positive electrode active material, a negative electrode including a negative electrode active material, a separator disposed between the positive electrode and the negative electrode, and the above-described gel polymer electrolyte.

Since the lithium secondary battery including the gel polymer electrolyte according to the present disclosure has improved thermal stability, a calorific value in a temperature range of 200° C. to 300° C. when a heat flow is measured by differential scanning calorimetry (DSC) is 100 J/g or less, wherein there may be few peaks. Specifically, the calorific value in a temperature range of 200° C. to 300° ° C. may be 80 J/g or less. This is considered to be because the ether diacrylate crosslinking agent containing a fluorinated group is more effective in suppressing the calorific value of the lithium secondary battery due to excellent heat absorption properties.

The heat flow measurement by the differential scanning calorimetry (DSC) may be measured using a DSC25 instrument by TA instrument, and a calorific value in a temperature range of 0° ° C. to 300° C. may be measured at a heating rate of 10° C./min using a Tzero hermetic aluminum pan.

The positive electrode may be prepared by coating a positive electrode current collector with a positive electrode material mixture slurry including a positive electrode active material, a binder, a conductive agent, and a solvent.

The positive electrode current collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium metal oxide including lithium and at least one metal such as cobalt, manganese, nickel, or aluminum. More specifically, the lithium metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}NizO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}CO_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$, etc.), or lithium nickel aluminum oxide (e.g., $LiNi_{0.8}Co_{0.15}Al_{0.05}O_2$, etc.), and any one thereof or a mixture of two or more thereof may be used. Preferably, the positive electrode active material may be a lithium-nickel-manganese-cobalt-based oxide.

The positive electrode active material may be included in an amount of 60 wt % to 99 wt %, preferably 70 wt % to 99 wt %, and more preferably 80 wt % to 98 wt % based on a total weight of solid content excluding the solvent in the positive electrode material mixture slurry.

The binder is a component that assists in the binding between the active material and the conductive agent and in the binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber, a fluoro rubber, or various copolymers.

The binder may commonly be included in an amount of 1 wt % to 20 wt %, preferably 1 wt % to 15 wt %, and more preferably 1 wt % to 10 wt % based on the total weight of the solid content excluding the solvent in the positive electrode material mixture slurry.

The conductive agent is a component for further improving conductivity of the positive electrode active material, wherein it may be added in an amount of 1 wt % to 20 wt % based on the total weight of the solid content in the positive electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; fluorocarbon powder; conductive powder such as aluminum powder and nickel powder; conductive whiskers such as zinc oxide whiskers and potassium titanate whiskers; conductive metal oxide such as titanium oxide; or polyphenylene derivatives, may be used.

The conductive agent may commonly be included in an amount of 1 wt % to 20 wt %, preferably 1 wt % to 15 wt %, and more preferably 1 wt % to 10 wt % based on the total weight of the solid content excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as optionally the binder and the conductive agent is included. For example, the solvent may be included in an amount such that a concentration of the solid content including the positive electrode active material as well as optionally the binder and the conductive agent is in a range of 50 wt % to 95 wt %, preferably 70 wt % to 95 wt %, and more preferably 70 wt % to 90 wt %.

The negative electrode, for example, may be prepared by coating a negative electrode material mixture slurry including a negative electrode active material, a binder, a conductive agent, and a solvent on a negative electrode current collector, or a graphite electrode formed of carbon (C) or a metal itself may be used as the negative electrode.

For example, in a case in which the negative electrode is prepared by coating the negative electrode material mixture slurry on the negative electrode current collector, the negative electrode current collector generally has a thickness of 3 μm to 500 μm. The negative electrode current collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode current collector, the negative electrode current collector may have fine surface roughness to improve bonding strength with the negative electrode active material, and the negative electrode current collector may be used in various shapes such as a film, a sheet, a foil, a net, a porous body, a foam body, a non-woven fabric body, and the like.

Also, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), Mg, calcium (Ca), strontium (Sr), silicon (Si), antimony (Sb), lead (Pb), indium (In), zinc (Zn), barium (Ba), radium (Ra), germanium (Ge), Al, and tin (Sn) or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0\leq x\leq 1$), $Li_xWO_2$ ($0\leq x\leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x\leq 1$; $1\leq y\leq 3$; $15z\leq 8$) may be used as the metal composite oxide.

The material, which may be doped and undoped with lithium, may include Si, $SiO_x$ ($0<x\leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 60 wt % to 99 wt %, preferably 70 wt % to 99 wt %, and more preferably 80 wt % to 98 wt % based on a total weight of solid content in the negative electrode material mixture slurry.

The binder is a component that assists in the binding between the conductive agent, the active material, and the current collector. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, or various copolymers thereof.

The binder may be commonly included in an amount of 1 wt % to 20 wt %, preferably 1 wt % to 15 wt %, and more preferably 1 wt % to 10 wt % based on the total weight of the solid content excluding the solvent in the negative electrode material mixture slurry.

The conductive agent is a component for further improving conductivity of the negative electrode active material, wherein the conductive agent may be added in an amount of 1 wt % to 20 wt % based on the total weight of the solid content in the negative electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; fluorocarbon powder; conductive powder such as aluminum powder and nickel powder; conductive whiskers such as zinc oxide whiskers and potassium titanate whiskers; conductive metal oxide such as titanium oxide; or polyphenylene derivatives, may be used.

The conductive agent may be included in an amount of 1 wt % to 20 wt %, preferably 1 wt % to 15 wt %, and more preferably 1 wt % to 10 wt % based on the total weight of the solid content excluding the solvent in the negative electrode material mixture slurry.

The solvent may include water or an organic solvent, such as NMP (N-methyl-2-pyrrolidone), and may be used in an amount such that desirable viscosity is obtained when the negative electrode active material as well as optionally the binder and the conductive agent is included. For example, the solvent may be included in an amount such that a concentration of the solid content including the negative electrode active material as well as optionally the binder and the conductive agent is in a range of 50 wt % to 95 wt %, for example, 70 wt % to 90 wt %.

In a case in which the metal itself is used as the negative electrode, the negative electrode may be a metal thin film itself or may be prepared by a method in which the metal is physically bonded, rolled, or deposited on the negative electrode current collector. As the deposition method, an electrical deposition method or a chemical vapor deposition method for the metal may be used.

For example, the metal thin film itself or the metal to be bonded/rolled/deposited on the negative electrode current collector may include one type of metal selected from the group consisting of lithium (Li), nickel (Ni), tin (Sn), copper (Cu), and indium (In) or an alloy of two types of metals.

Also, a conventional porous polymer film typically used, for example, a porous polymer film prepared from a polyolefin-based polymer, such as an ethylene homopolymer, a ethylene/butene copolymer, an propylene homopolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present disclosure is not limited thereto. Furthermore, a coated separator including a ceramic component or a polymer material may be used to secure heat resistance or mechanical strength, and the separator having a single layer or multilayer structure may be optionally used.

A shape of a lithium secondary battery case of the present disclosure is not particularly limited, but a cylindrical type using a can, a prismatic type, a pouch type, or a coin type may be used.

An amount of the gel polymer electrolyte based on the entire secondary battery may be in a range of 10 wt % to 30 wt %, preferably 10 wt % to 25% wt %, and more preferably 10 wt % to 20 wt %. In a case in which the amount of the gel polymer electrolyte satisfies the above range, high ionic conductivity and thermal stability may not only be secured, but there is also an advantage in that a lithium secondary battery with improved cycle life characteristics and safety may be prepared.

A method of preparing the lithium secondary battery of the present disclosure may include the steps of: preparing an electrode assembly including the above-described positive electrode, negative electrode, and separator disposed between the positive electrode and the negative electrode; inserting the electrode assembly into a battery case; preparing a gel polymer electrolyte precursor solution including a thiol compound containing at least four reactive thiol groups per molecule, a fluorinated polyether diacrylate, an organic solvent, a lithium salt, and a thermal polymerization initiator; and injecting the precursor solution into the battery case in which the electrode assembly has been inserted and performing a heat treatment to proceed a crosslinking reaction.

The gel polymer electrolyte precursor solution may be prepared by mixing a thiol compound containing at least four reactive thiol groups per molecule, a fluorinated polyether diacrylate, an organic solvent, a lithium salt, and a thermal polymerization initiator. Since the thiol compound, the fluorinated polyether diacrylate, the organic solvent, and the lithium salt have been described above, detailed descriptions thereof will be omitted.

As the thermal polymerization initiator, for example, at least one selected from the group consisting of a peroxy initiator and an azo initiator may be used. Specifically, the peroxy initiator includes t-butylperoxypivalate, 1-cyclohexyl-1-methylethyl peroxy-2-ethyl hexanonate, t-butyl peroxy isopropyl monocarbonate, and t-butyl triallyl silyl peroxide. Specific examples of the azo initiator are 2, 2 '-azobis (4-methoxy-2,4-dimethyl valeronitrile), dimethyl 2, 2'-azobis(2-methyl propionate), and 2,2'-azobis(N-cyclohexyl-2-methyl propionamide.

The thermal polymerization initiator may be included in an amount of 0.005 part by weight to 5.0 parts by weight, preferably 0.01 part by weight to 3.0 parts by weight, and more preferably 0.01 part by weight to 1 part by weight based on 100 parts by weight of a combined weight of the thiol compound, the fluorinated polyether diacrylate, the organic solvent, and the lithium salt. In a case in which the amount of the thermal polymerization initiator satisfies the above range, reactivity of the click reaction between thiol of the thiol compound containing at least four reactive thiol groups per molecule and the acrylic group of the fluorinated polyether diacrylate is excellent for the thiol-ene structure.

The heat treatment may be performed at a temperature of 50° C. to 80° C., preferably 55° ° C. to 75° C., and more preferably 65° ° C. to 75° C. In a case in which the heat treatment temperature is less than 50° ° C., since radicals for polymerization are not sufficiently generated, there is a problem in that efficiency in completing the polymerization is reduced and a residual unreacted crosslinking agent degrades battery performance, and, in a case in which the heat treatment temperature is greater than 80° C., there may be a problem in that the electrolyte material is degraded or the structure is deformed.

The heat treatment time may be in a range of 0.5 hours to 3 hours, for example, 1.5 hours to 2.5 hours. In a case in which the heat treatment time is less than 0.5 hours, since the polymerization reaction does not sufficiently occur, a high polymerization conversion rate may not be ensured, a uniform polymer may not be obtained, and there is a problem in that the residual unreacted crosslinking agent degrades the battery performance. In a case in which the heat treatment time is greater than 3 hours, there may be a problem in that the material is degraded or the structure is deformed.

Hereinafter, the present disclosure will be described in detail, according to specific examples. However, the following examples are merely presented to exemplify the present disclosure, and the scope of the present disclosure is not limited thereto. It will be apparent to those skilled in the art that various modifications and alterations are possible within the scope and technical spirit of the present disclosure, and such modifications and alterations fall within the scope of claims included herein.

EXAMPLES

Example 1

(Gel Polymer Electrolyte Precursor Solution Preparation)

0.38 g of tetrakis(3-mercapto pentaerythritol propionate) and 0.62 g of the fluorinated polyether diacrylate of Formula 1-2 were mixed so that the numbers of moles of reactive functional groups were the same, and 5 g of lithium bis (trifluoromethanesulphonyl)imide (LiTFSI) as a lithium salt, 4 g of dimethyl carbonate (DMC) as an organic solvent, and 0.03 g of t-butyl peroxypivalate (t-BPP), as an initiator, were added to prepare a gel polymer electrolyte precursor solution which included a cross-linked polymer having a thiol-ene structure.

(Lithium Secondary Battery Preparation)

A positive electrode active material ($LiNi_{0.6}Co_{0.2}Mn_{0.2}O_2$): a conductive agent (Super P):a binder (polyvinylidene fluoride) were added in a weight ratio of 95:3:2 to N-methyl-2-pyrrolidone (NMP), as a solvent, to prepare a positive electrode slurry (solid content 75 wt %). One surface of a 20 μm thick positive electrode current collector (Al thin film) was coated with the positive electrode slurry, dried, and roll-pressed to prepare a positive electrode.

A negative electrode active material (graphite): a conductive agent (Super P):a binder (polyvinylidene fluoride) were added to N-methyl-2-pyrrolidone (NMP), as a solvent, in a weight ratio of 90:3:7 to prepare a negative electrode slurry (solid content 60 wt %)·One surface of a 15 μm thick negative electrode current collector (Cu thin film) was coated with the negative electrode slurry, dried, and roll-pressed to prepare a negative electrode.

An electrode stack was prepared by disposing a polyethylene separator between the above-prepared positive electrode and negative electrode in a glove box and the electrode stack was inserted into a battery case. A secondary battery cell was prepared by injecting the precursor solution into the battery case and performing a heat treatment at 70° C. for 2 hours to proceed a cross-linking reaction.

Example 2

A secondary battery cell was prepared in the same manner as in Example 1 except that 0.76 g of pentaerythritol tetrakis(3-mercapto propionate) and 1.24 g of the fluorinated polyether diacrylate of Formula 1-2 were mixed so that the numbers of moles of reactive functional groups were the same, and 4 g of lithium bis(trifluoromethanesulphonyl) imide (LiTFSI) as a lithium salt, 4 g of dimethyl carbonate (DMC) as an organic solvent, and 0.03 g of t-butyl peroxypivalate (t-BPP), as an initiator, were added to prepare a gel polymer electrolyte precursor solution.

Example 3

A secondary battery cell was prepared in the same manner as in Example 1 except that 1.14 g of pentaerythritol tetrakis(3-mercapto propionate) and 1.86 g of the fluorinated polyether diacrylate of Formula 1-2 were mixed so that the numbers of moles of reactive functional groups were the same, and 3 g of lithium bis(trifluoromethanesulphonyl) imide (LiTFSI) as a lithium salt, 4 g of dimethyl carbonate (DMC) as an organic solvent, and 0.03 g of t-butyl peroxypivalate (t-BPP), as an initiator, were added to prepare a gel polymer electrolyte precursor solution.

Example 4

A secondary battery cell was prepared in the same manner as in Example 1 except that 0.38 g of pentaerythritol tetrakis(3-mercapto propionate) and 0.62 g of the fluorinated polyether diacrylate of Formula 1-2 were mixed so that the numbers of moles of reactive functional groups were the same, and 5 g of lithium bis(trifluoromethanesulphonyl) imide (LiTFSI) as a lithium salt, 4 g of dimethyl carbonate (DMC) as an organic solvent, 0.03 g of t-butyl peroxypivalate (t-BPP) as an initiator, and 0.1 g of vinylene carbonate (VC), as an additive, were added to prepare a gel polymer electrolyte precursor solution.

Comparative Example 1

(Liquid Electrolyte Preparation)

5 g of lithium bis(trifluoromethanesulphonyl)imide (LiTFSI), as a lithium salt, and 4 g of dimethyl carbonate (DMC), as an organic solvent, were mixed to prepare a liquid electrolyte.

(Lithium Secondary Battery Preparation)

A positive electrode active material ($LiNi_{0.6}Co_{0.2}Mn_{0.2}O_2$): a conductive agent (Super P):a binder (polyvinylidene fluoride) were added in a weight ratio of 95:3:2 to N-methyl-2-pyrrolidone (NMP), as a solvent, to prepare a positive electrode slurry (solid content 75 wt %). One surface of a 20 μm thick positive electrode current collector (Al thin film) was coated with the positive electrode slurry, dried, and roll-pressed to prepare a positive electrode.

A negative electrode active material (graphite): a conductive agent (Super P): a binder (polyvinylidene fluoride) were added to N-methyl-2-pyrrolidone (NMP), as a solvent, in a weight ratio of 90:3:7 to prepare a negative electrode slurry (solid content 60 wt %). One surface of a 15 μm thick negative electrode current collector (Cu thin film) was coated with the negative electrode slurry, dried, and roll-pressed to prepare a negative electrode.

After disposing a polyethylene separator between the above-prepared positive electrode and negative electrode in a dry room, the liquid electrolyte was injected to prepare a secondary battery cell.

Comparative Example 2

A secondary battery cell was prepared in the same manner as in Example 1 except that 0.49 g of pentaerythritol tetrakis(3-mercapto propionate) and 0.51 g of polyether diacrylate of the following Formula A were mixed so that the numbers of moles of reactive functional groups were the same, and 5 g of lithium bis(trifluoromethanesulphonyl) imide (LiTFSI) as a lithium salt, 4 g of dimethyl carbonate (DMC) as an organic solvent, and 0.03 g of t-butyl peroxypivalate (t-BPP), as an initiator, were added to prepare a gel polymer electrolyte precursor solution.

[Formula A]

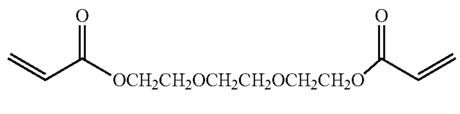

Experimental Example 1—Ionic Conductivity Measurement

An ionic conductivity value for each temperature of the prepared gel polymer electrolytes in the secondary batteries in Examples 1 to 4 and Comparative Example 2 was measured. Specifically, ionic conductivities of the gel polymer electrolytes prepared in Examples 1 to 4 and Comparative Example 2 were analyzed using IM6 by Zahner Electrik, and the results thereof are presented in Table 1 below.

TABLE 1

| | Ionic conductivity (S/cm) | |
|---|---|---|
| | 25° C. | 45° C. |
| Example 1 | $2.0 \times 10^{-3}$ | $2.9 \times 10^{-3}$ |
| Example 2 | $1.8 \times 10^{-3}$ | $2.7 \times 10^{-3}$ |
| Example 3 | $1.5 \times 10^{-3}$ | $2.0 \times 10^{-3}$ |
| Example 4 | $2.2 \times 10^{-3}$ | $3.1 \times 10^{-3}$ |
| Comparative Example 2 | $1.3 \times 10^{-3}$ | $1.8 \times 10^{-3}$ |

The gel polymer electrolytes of Examples 1 to 4 exhibited high ionic conductivities of $1.3\times10^{-3}$ S/cm or more at room temperature, and exhibited high ionic conductivities of $2.0\times10^{-3}$ S/cm or more at 45° C. Also, the gel polymer electrolytes of Examples 1 to 4 exhibited higher ionic conductivities than the gel polymer electrolyte of Comparative Example 2.

Experimental Example 2—Electrochemical Stability Evaluation

Linear sweep voltammograms (LSV) were measured in order to evaluate electrochemical stabilities of the electrolytes of Example 1 and Comparative Example 1. An LSV experiment was performed at a scan rate of 1 mV/s at 25° ° C., and the results thereof are presented in FIG. 1.

As illustrated in FIG. 1, it was confirmed that the gel polymer electrolyte of Example 1, which was prepared by using the fluorinated ether diacrylate, was stable up to 5.3 V without electrochemical decomposition. In contrast, since the electrolyte of Comparative Example 1 was decomposed at about 5.1 V, it may be confirmed that its electrochemical stability was lower than that of the gel polymer electrolyte of Example 1.

Experimental Example 3—Cycle Characteristics Evaluation

Cycle characteristics were evaluated for each of the secondary batteries prepared in Examples 1 to 4 and Comparative Examples 1 and 2.

Specifically, after charging of each of the secondary batteries prepared in Examples 1 to 4 and Comparative Examples 1 and 2 at a constant current of 0.1 C to 4.2 V at 25° C. and discharging of each secondary battery at a constant current of 0.1 C to 3.0 V were set as one cycle and 100 cycles of the charging and discharging were performed, capacity retention relative to initial capacity after 100 cycles was measured. The results thereof are presented in Table 2 below.

TABLE 2

| | Capacity retention (%) |
|---|---|
| Example 1 | 84.3 |
| Example 2 | 82.7 |
| Example 3 | 81.5 |
| Example 4 | 93.6 |
| Comparative Example 1 | 64.7 |
| Comparative Example 2 | 62.6 |

The secondary batteries of Examples 1 to 4 using the gel polymer electrolytes according to the present disclosure had better life characteristics than the secondary battery of Comparative Example 1 using the liquid organic solvent electrolyte. Also, the secondary batteries using Examples 1 to 4 had better life characteristics than the secondary battery of Comparative Example 2 using the carbon-based polyethylene acrylate crosslinking agent not containing a fluorine group.

Experimental Example 4—Thermal Stability Evaluation

A calorific value during charging and discharging of each of the secondary batteries prepared in Example 1, Comparative Examples 1, and Comparative Example 2 was measured using a differential scanning calorimeter (TA instrument, DSC25). Specifically, 0.0016 g of each of the secondary batteries prepared in Example 1, Comparative Examples 1, and Comparative Example 2 was put into a pressure-resistant pen for measuring differential scanning calorimetry (DSC). A temperature range for DSC analysis was 25° C. to 400° C., and a heating rate was 10° C./min. A heat flow according to temperature was measured for each secondary battery. Measurement results were illustrated in FIGS. 2A to 2C.

Referring to FIG. 2A, since the secondary battery of Example 1 had excellent thermal stability, a calorific value in a temperature range of 200° ° C. to 300° C. was 75.4 J/g, and thus, it may be confirmed that a peak hardly appeared.

Figure 2B:
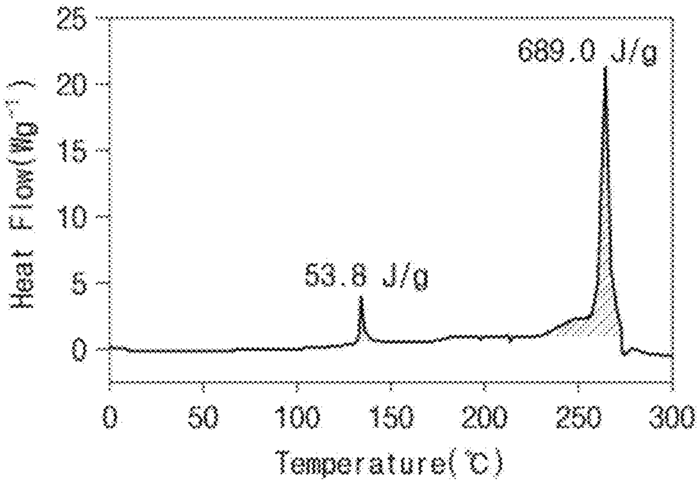

In contrast, referring to FIG. 2B, with respect to the secondary battery of Comparative Example 1, distinct exothermic peaks were observed in a low-temperature part and a high-temperature part, and, particularly, a high calorific value of 689.0 J/g was exhibited in a temperature range of 200° ° C. to 300° C.

Figure 2C:
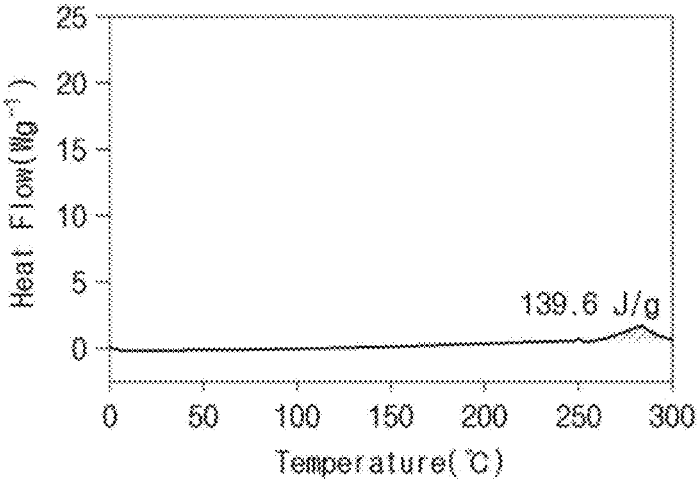

Referring to FIG. 2C, it may be confirmed that the secondary battery of Comparative Example 2 using the carbon-based polyethylene acrylate crosslinking agent exhibited a calorific value of 139.6 J/g in a temperature range of 200° ° C. to 300° C. The secondary battery using the gel polymer electrolyte of Comparative Example 2 exhibited a higher calorific value than the secondary battery using the gel polymer electrolyte of Example 1 according to the present disclosure. Therefore, it may be understood that the use of the fluorinated polyether diacrylate crosslinking agent was more effective in suppressing heat generation of the lithium secondary battery than the use of the acrylate crosslinking agent in which a fluoro group was not substituted.

The invention claimed is:

1. A gel polymer electrolyte comprising:

a cross-linked polymer having a thiol-ene structure, wherein the thiol-ene structure is formed by a click reaction of:

a thiol group of a thiol compound containing at least four reactive thiol groups per molecule, and an acrylic group of a fluorinated polyether diacrylate.

2. The gel polymer electrolyte of claim 1, wherein the thiol compound includes at least one selected from the group consisting of pentaerythritol tetrakis(3-mercaptopropionate), dipentaerythritol hexakis(3-mercaptopropionate), pentaerythrityl tetrathiol, tetrakis(2-mercaptoethyl)silane, and benzene-1,2,4,5-tetrathiol.

3. The gel polymer electrolyte of claim 1, wherein the fluorinated polyether diacrylate is represented by Formula 1:

[Formula 1]

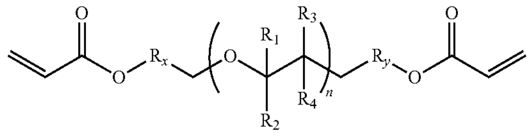

wherein, in the Formula 1, $R_x$ and $R_y$ are each independently an alkylene group having 1 to 10 carbon atoms, $R_1$ to $R_4$ are each independently selected from hydrogen (H), an alkyl group having 1 to 10 carbon atoms, and halogen, at least one of $R_1$ to $R_4$ is halogen, and n is an integer of 1 to 5.

4. The gel polymer electrolyte of claim 1, wherein the fluorinated polyether diacrylate is represented by Formula 1-1:

[Formula 1-1]

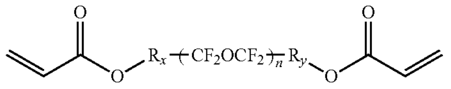

wherein, in the Formula 1-1, $R_x$ and $R_y$ are each independently an alkylene group having 1 to 10 carbon atoms, and n is an integer of 1 to 5.

5. The gel polymer electrolyte of claim 1, wherein the fluorinated polyether diacrylate is represented by Formula 1-2:

[Formula 1-2]

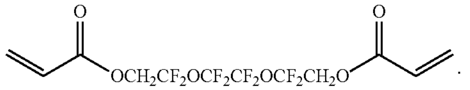

6. The gel polymer electrolyte of claim 1, wherein a weight-average molecular weight of the fluorinated polyether diacrylate is in a range of 200 g/mol to 2,000 g/mol.

7. The gel polymer electrolyte of claim 1, further comprising a lithium salt and an organic solvent.

8. The gel polymer electrolyte of claim 7, wherein a weight ratio of the cross-linked polymer having the thiol-ene structure to the lithium salt is in a range of 1:11 to 1:0.5.

9. The gel polymer electrolyte of claim 7, wherein the cross-linked polymer having the thiol-ene structure is included in an amount of 10 parts by weight to 80 parts by weight based on 100 parts by weight of the organic solvent.

10. The gel polymer electrolyte of claim 1, wherein lithium ion conductivity is $1.0\times10^{-3}$ S/cm or more at 25° C.

11. The gel polymer electrolyte of claim 1, wherein lithium ion conductivity is $2.0\times10^{-3}$ S/cm or more at 45° C.

12. The gel polymer electrolyte of claim 1, further comprising an additive that includes at least one compound selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

13. The gel polymer electrolyte of claim 12, wherein the additive is included in an amount of 0.01 wt % to 2 wt % based on a total weight of the gel polymer electrolyte.

14. A lithium secondary battery comprising the gel polymer electrolyte of claim 1.

15. The lithium secondary battery of claim 14, wherein, when a heat flow of the lithium secondary battery is measured by differential scanning calorimetry (DSC), a calorific value in a temperature range of 200° C. to 300° C. is 100 J/g or less.

16. A method of preparing a lithium secondary battery, the method comprising:

preparing an electrode assembly including a positive electrode, a negative electrode, and a separator disposed between the positive electrode and the negative electrode;

inserting the electrode assembly into a battery case;

preparing a gel polymer electrolyte precursor solution including a thiol compound containing at least four reactive thiol groups per molecule, a fluorinated polyether diacrylate, an organic solvent, a lithium salt, and a thermal polymerization initiator; and injecting the precursor solution into the battery case having the electrode assembly and performing a heat treatment to proceed a crosslinking reaction.

17. The method of claim 16, wherein the heat treatment is performed at a temperature of 50° C. to 80° C. for 0.5 hours to 3 hours.

* * * * *